United States Patent
Li

(10) Patent No.: US 9,244,275 B1
(45) Date of Patent: Jan. 26, 2016

(54) VISUAL DISPLAY SYSTEM USING MULTIPLE IMAGE SOURCES AND HEADS-UP-DISPLAY SYSTEM USING THE SAME

(75) Inventor: Shu Li, Fremont, CA (US)

(73) Assignee: ROCKWELL COLLINS, INC., Cedar Rapids, IA (US)

( * ) Notice: Subject to any disclaimer, the term of this patent is extended or adjusted under 35 U.S.C. 154(b) by 1051 days.

(21) Appl. No.: 12/501,175

(22) Filed: Jul. 10, 2009

(51) Int. Cl.
*G02B 27/01* (2006.01)
*G02B 5/02* (2006.01)

(52) U.S. Cl.
CPC .............. *G02B 27/01* (2013.01); *G02B 5/0252* (2013.01)

(58) Field of Classification Search
CPC .. G02B 27/01; G02B 5/0252; G02B 27/0149; G02B 5/18; G02B 5/30; G02B 27/0101; G02B 6/34; G02B 2027/015; G02B 3/001
USPC ............................ 345/7–9; 359/630–631, 690
See application file for complete search history.

(56) References Cited

U.S. PATENT DOCUMENTS

| | | | |
|---|---|---|---|
| 3,711,826 A | 1/1973 | La Russa | |
| 3,936,148 A | 2/1976 | Ellis | |
| 3,940,204 A | 2/1976 | Withrington | |
| 4,020,376 A * | 4/1977 | Bosserman et al. | ... 313/103 CM |
| 4,213,146 A | 7/1980 | Maiman | |
| 4,329,012 A | 5/1982 | Minoura | |
| 4,582,389 A | 4/1986 | Wood | |
| 4,669,810 A | 6/1987 | Wood | |
| 4,763,990 A | 8/1988 | Wood | |
| 4,832,449 A * | 5/1989 | Mundy et al. | ................. 359/630 |

(Continued)

FOREIGN PATENT DOCUMENTS

| | | |
|---|---|---|
| EP | 0344810 A2 * | 12/1989 |
| EP | 1494062 A2 * | 1/2005 |

(Continued)

OTHER PUBLICATIONS

Nicolaus Hettler and Robert Hutchins, Novel Optics: Plastic micro-optics cater to automotive HUD Design, Laser Focus World, Dec. 10, 2014, pp. 1-12, http://www.laserfocusworld.com/articles/print/volume-50/issue-12/features/novel-optics-plastic-micro-optics-cater-to-automotive-hud-design.html, downloaded on Feb. 12, 2015.

*Primary Examiner* — Amare Mengistu
*Assistant Examiner* — Stacy Khoo
(74) *Attorney, Agent, or Firm* — Angel Gerdzhkov; Donna Suchy; Daniel Barbieri

(57) ABSTRACT

A visual display system includes a first image source for producing a first image containing symbological information using a vector drawing system. A second image source produces a second image containing video, graphical, and/or symbology information with a brightness lower than the brightness of the first image. A light combining optical element combines the light from the first and the second image sources. An image forming optical system receives the combined light from the light combining optical element for forming a new image comprising a superimposition of the first image and the second image at a final image plane of the system. A light receiving element, located at the final image plane of the system, receives the new image from the image forming optical system and adjusts the characteristics of the light from the new image to generate a final image for direct or indirect viewing. The visual display system is particularly adaptable for use in a Heads-Up-Display (HUD) system.

13 Claims, 3 Drawing Sheets

(56) References Cited

U.S. PATENT DOCUMENTS

| | | | |
|---|---|---|---|
| 5,091,867 A * | 2/1992 | Clark et al. | 345/501 |
| 5,130,838 A | 7/1992 | Tanaka | |
| 5,162,928 A | 11/1992 | Taniguchi | |
| 5,198,895 A | 3/1993 | Vick | |
| 5,231,538 A * | 7/1993 | Anderson | 359/462 |
| 5,243,448 A * | 9/1993 | Banbury | 359/13 |
| 5,294,940 A | 3/1994 | Wennagel | |
| 5,302,964 A | 4/1994 | Lewins | |
| 5,381,338 A * | 1/1995 | Wysocki et al. | 701/409 |
| 5,721,679 A * | 2/1998 | Monson | 701/50 |
| 5,782,553 A * | 7/1998 | McDermott | 362/245 |
| 5,801,792 A | 9/1998 | Smith | |
| 6,285,345 B1 | 9/2001 | Crossland | |
| 6,312,129 B1 * | 11/2001 | Sisodia et al. | 353/31 |
| 6,359,737 B1 * | 3/2002 | Stringfellow | 359/631 |
| 6,388,697 B1 | 5/2002 | Sonehara et al. | 347/239 |
| 6,445,365 B1 * | 9/2002 | Taniguchi et al. | 345/9 |
| 6,762,867 B2 | 7/2004 | Lippert | |
| 6,876,784 B2 * | 4/2005 | Nikolov et al. | 385/11 |
| 6,947,198 B2 | 9/2005 | Morikawa | |
| 6,984,044 B2 * | 1/2006 | Kurioka et al. | 353/99 |
| 7,005,197 B2 | 2/2006 | Shiiki | |
| 7,015,876 B1 | 3/2006 | Miller | |
| 7,031,067 B2 | 4/2006 | Voloschenko | |
| 7,144,121 B2 * | 12/2006 | Minano et al. | 353/94 |
| 7,202,953 B1 * | 4/2007 | Mueller et al. | 356/445 |
| 7,209,271 B2 | 4/2007 | Lewis | |
| 7,210,792 B2 | 5/2007 | Peterson | |
| 7,210,977 B2 | 5/2007 | Ouderkirk | |
| 7,442,918 B2 | 10/2008 | Sprague | |
| 7,447,402 B2 | 11/2008 | Sonoda | |
| 7,460,305 B2 | 12/2008 | Powell | |
| 7,513,668 B1 | 4/2009 | Peng | |
| 8,170,729 B2 * | 5/2012 | Nichols et al. | 701/4 |
| 2003/0076280 A1 * | 4/2003 | Turner et al. | 345/7 |
| 2008/0186547 A1 * | 8/2008 | Shimizu et al. | 359/13 |
| 2009/0027919 A1 * | 1/2009 | Feng et al. | 362/616 |
| 2009/0128901 A1 * | 5/2009 | Tilleman et al. | 359/475 |
| 2010/0110308 A1 * | 5/2010 | Nicholson et al. | 348/744 |
| 2010/0253593 A1 * | 10/2010 | Seder et al. | 345/7 |

FOREIGN PATENT DOCUMENTS

| | | | |
|---|---|---|---|
| GB | 2222892 A * | 3/1990 | |
| JP | 60015621 A * | 1/1985 | |

* cited by examiner

VISUAL DISPLAY SYSTEM USING MULTIPLE IMAGE SOURCES AND HEADS-UP-DISPLAY SYSTEM USING THE SAME

BACKGROUND OF THE INVENTION

1. Field of the Invention

The present invention is related to a high quality visual display system with high performance and low power consumption. In particular, the present invention is related to a visual display system using multiple image sources, each of which independently produces an image with distinct information content. The images are subsequently or simultaneously combined together in an optical system to form a final superimposed image. More particularly, the present invention is related to see-through visual display systems with very high image brightness, such as heads-up-display systems.

2. Description of the Related Art

Most visual display systems include a single image source. Some visual display systems include multiple image sources but usually each image source displays the same information content. The Cathode-ray-tube (CRT) has been the primary display technology for years, and is used in many types of visual display systems. A CRT can produce high quality and high brightness images with good efficiency. Small size CRT displays with proper phosphors can produce a high quality image with luminance of several thousand to more than ten thousand foot-Lamberts. In addition, CRTs can operate in both raster scan mode, a sequential addressing scheme for producing graphic images; and, stroke mode, a random addressing scheme for producing simple symbolic images. Stroke mode is also known as vector scan mode. It addresses the electron beam directly to the phosphor screen according to the x-y coordinate information, in contrast to the line-by-line scan of a raster scan scheme. In the stroke mode or vector scan mode, sometimes also referred as the vector drawing mode, only simple symbolic or iconic images are presented in designated locations on the phosphor screen. The scanning speed can be relatively slower in comparison to the raster scan, thus producing much higher luminance than the images produced by the raster scan mode. Typical symbology images contain much less addressed pixels, so they can be generated within a relatively short period of time. This is critical for time-sensitive applications. CRT displays also have very high static and dynamic contrast ratios, because the electron beam is turned-off when scanning through the dark field or the background of symbolic images.

However, CRT displays have certain shortcomings. First, they have relatively low reliability because of their high operating voltage. For applications that require high reliability under harsh environmental conditions, CRT displays require frequent and expensive maintenance. Second, CRT displays have a limit on resolution, because of their magnetic-deflecting mechanisms. This imposes not only a limit on the resolution of the image, but also restricts the maximum information content to be displayed. This is particularly important for displaying high quality graphic or video images. Compared to other display products of the same size, CRT displays are relatively bulky and heavy, not to mention the volume and weight of their high voltage power supplies. When a CRT operates in the dual mode, raster mode and stroke mode in a time sequential manner, to display high brightness symbology and relatively low brightness video images together, both raster video resolution and the symbology content are limited. In addition, the analog nature of CRT displays has prevented them from being implemented in many digital applications.

Because of all of these disadvantages, CRT displays have been replaced by more reliable, high resolution, and all digital display technology, such as active-matrix-liquid crystal displays (AMLCD) in the market that was once dominated by CRTs, such as television sets, computer monitors, and displays in the cockpits of commercial and military aircraft. Today, the availability of CRT products is from scarce to none.

Liquid crystal displays have evolved to become the dominant display technology in the last 20 years, replacing CRT displays in many applications, including computer monitors and television sets. The primary liquid crystal display technology today is the active-matrix addressed liquid crystal light valves in a variety of sizes, resolutions, and optical schemes. Liquid crystal displays are light in weight, compared to CRT displays of the same size. They have acceptable wall-plug efficiency, as a result of the high efficiency backlight; can be made at very high resolution; and they can operate reliably under harsh conditions. Although still relatively expensive, LCD technology is the choice of the display technology for today's digital information display systems.

However, liquid crystal displays, although improved dramatically over last ten years, still suffer by relatively poor optical performance. There are two prominent performance issues associated with liquid crystal displays: 1) Low contrast due to light leakage from the light valve of the OFF pixels; and, 2) Motion artifact due to the slow electro-optical response of liquid crystal material, and the addressing scheme. Low contrast ratio severely reduces the dynamic range of the image, and causes the dark background of the image to "glow". This is particularly problematic when viewing the display in dark ambient. The background glow can be very disturbing and distracting. The motion artifact not only degrades the overall quality of the image, but also may cause important information on the image to be blurred, distorted, delayed, or missed. Typical motion artifact is the "contrail" behind a fast-moving subject in the image.

In the active matrix liquid crystal displays (AMLCD), the image pixels are controlled by the actively addressed array of thin-film-transistors (TFT) using the sequential addressing, a raster scan scheme, to generate the image in a line-by-line fashion. Different than CRTs, AMLCDs can only operate in the raster mode. For displaying typical graphic or video images, this is adequate enough. However, in some special display systems, such as heads-up-displays, where symbology image is the dominant content of the information, and often changing rapidly, the raster scan type addressing scheme shows significant latency in displaying the information.

The efficiency of liquid crystal displays is relatively low. It is a function of pixel size. For large format displays, in which the pixels are relatively large, the efficiency does not seem to be an issue. However, small size and high resolution AMLCDs have fairly low transmission efficiency, typically only ~5% or less for full color displays, and <15% for monochrome displays. For typical computer monitors or TV sets, which require a few tens to 100-300 foot-Lambert luminance, such a low efficiency is not necessarily a problem. However, at such a low efficiency, it would require extremely bright backlight to produce display luminance higher than 1,000 foot-Lambert. To produce 10,000 foot-Lambert, the backlight design becomes a scientific and engineering challenge. Practically, a high resolution small AMLCD display with luminance at 10,000 foot-Lambert will consume more power than an equal size CRT. The volume of such as display, including the cooling mechanism for the backlight, is not much smaller than the CRT. Therefore, liquid crystal displays are the best at producing an image with luminance below ~1000 foot-Lambert.

Optical scanning is another display technology. In recent years, miniature micro-electro-mechanical system (MEMS)-based one-dimensional or two-dimensional optical scanners are emerging to become a viable display technology. Optical scanners steer a high intensity light beam into a designated direction and location. Combined with the modulation of the light beam, an optical scanner can produce an image on an image screen, similar to a CRT display, which scans an electron beam to form an image on a phosphor screen. Optical scanner-based displays function like emissive displays, even though the scanner device themselves are non-emissive. Light source directly modulated by the image data signal can produce very high display contrast. These miniature optical scanners are compact in size; use a minimum amount of power; have very high optical efficiency; and, can scan at very high speed. Display systems using these optical scanners have been demonstrated. Two-dimensional images can be generated by two one-dimensional scanners or one two-dimensional scanner.

Optical scanners, depending on scanner design and implementation, can operate 1) in vector drawing mode, a random addressing scheme similar to stroke mode in a CRT, drawing the image according to the coordinate information of the light beam; or, 2) raster scan mode, scanning the light beam onto an image screen in a line-by-line fashion. Vector scanners typically consist of two one-dimensional scanners: a first one directing light in a horizontal direction and a second one directing light from the first one in vertical direction, or vise versa. This type of optical scanner is suitable for producing symbology images with very high efficiency and high resolution.

Optical scanners can also be used to produce graphic or video images. Either one-dimensional or two-dimensional devices can be used in generating video images. In either case, the scanners operate in the raster mode, scanning the light beam line-by-line to form the image. One-dimensional video scanners have been used to produce high quality images, such as in specialty large format laser scanning displays. Two dimensional MEMS scanners have been developed to show video or graphic images. The video display systems using one-dimensional scanners are relatively complex in optical and mechanical design. The video displays using two-dimensional MEMS devices have limited resolution because of the limit of the resonance frequency of such devices.

There are other types of light modulating devices that can produce high quality images. For example, the Spatial Light Modulators or other Optical Phase Array (OPA) devices can produce images using the phase modulation/interference of the light beam. In principle, these type of devices can generate high contrast image with minimum power consumption. They all have been proposed or already implemented in some visual display systems.

For display systems requiring luminance up to 10,000 foot-Lambert, CRT and optical scanners seem to be the ideal choice for a high efficiency and low power consumption system to produce symbology images using a vector scan addressing scheme. For high resolution graphic or video displays, active matrix addressed liquid crystal displays are good choices, but image luminance is limited to 1,000-2,000 foot-Lambert maximum because of the limit in backlight technology, and restrains of power of the display system.

Small to medium size CRTs have previously and are still being used as the image source for heads-up-displays (HUD) in the last several decades. CRTs have some ideal characteristics for HUD applications, such as extremely high luminance, low latency, high dynamic range, high contrast ratio, good image quality, relatively low power consumption, and they can function under harsh ambient conditions. Not until recent years have AMLCD image sources been implemented in some new HUD designs. However, AMLCDs cannot simply replace CRT image sources in many existing HUD systems, because they lack some of the critical characteristics of CRTs, such as high contrast ratio and high luminance at low power consumption. Optical image scanners are a new emerging display technology, having some similar characteristics as CRT displays, such as high contrast ratio, high luminance, compact size and low power consumption, and functionality over wide ambient conditions. Especially, the vector scanning type devices have been demonstrated to produce high luminance and high quality symbology images. It appears that optical scanners can become a feasible candidate for the image source in a HUD system for producing high luminance symbology and graphic images.

In a HUD system in which both graphic/video and symbology images are displayed, the graphic/video images and symbology images are often from different origins but combined into a data stream as the input to the HUD system. For instance, the raster video image may be from a camera or from other types of image sensors; and, the stroke symbology images are from a graphic generation engine of the instrument or computer system of a vehicle on which the HUD is installed. The image signals of both types of images are combined to be sent through a common input interface to the image source, and then displayed in a time-sequential manner in a CRT display. However, to display such a combined image signal on an AMLCD, the signal has to be converted to a raster-only signal for the AMLCD to display. Combining and later converting the symbology and video data may result in significant delays in displaying time-sensitive information to the viewer of the HUD. It would be ideal if different types of images from different origins can be displayed simultaneously or sequentially in an image producing system without any combination and subsequent conversion or separation of image signals.

SUMMARY OF THE INVENTION

In a broad aspect, the present invention is embodied as a visual display system and includes a first image source for producing a first image containing symbological information using a vector drawing system. A second image source produces a second image containing video, graphical, and/or symbology information with a brightness lower than the brightness of the first image. A light combining optical element combines the light from the first and the second image sources. An image forming optical system receives the combined light from the light combining optical element for forming a new image comprising a superimposition of the first image and the second image at a final image plane of the system. A light receiving element, located at the final image plane of the system, receives the new image from the image forming optical system and adjusts the characteristics of the light from the new image to generate a final image for direct or indirect viewing.

In another broad aspect, the visual display system includes a first image source for producing a first image containing symbological information using a vector drawing system. A second image source produces and projects a second image containing video, graphical, and/or symbology information with a brightness lower than the brightness of the first image.

A light combining optical element combines the light from the first and the second image sources to form a common light path thereafter, comprising a superimposition of the first image and the second image at a final image plane of the visual display system. A light receiving element located at the final image plane of the visual display system receives the light from the first image source and the second image source for forming a final combined image, and further controlling the characteristics of the light emitted from the final image.

The principles of the present invention are particularly adapted for use in a heads-up-display (HUD). In a HUD implementation the HUD system includes an image producing system comprising a plurality of illumination and image sources. A first image source produces a first image containing symbological information using a vector drawing system. A second image source produces a second image containing video, graphical, and/or symbology information with a brightness lower than the brightness of the first image. A projection optics assembly projects the image from the image producing system. A see-through image combining element, with partially reflective coatings and dioptric power, is operatively connected to the projection optics assembly and cooperates with the projection optics assembly for projecting the light from the projection optics assembly to form an infinity focus, and directs the projected image from the projection optics assembly to the viewer's line-of-sight and forms an image superimposed on the real scene as seen through the combining element by the viewer throughout viewer's field-of-view.

The present invention combines the benefits of vector scan display and raster scan display technologies for providing a solution for a visual display system which requires extremely high luminance, high contrast ratio, low system latency, and low power consumption. The present invention is compact and highly reliable. It can produce images with quality as high as conventional CRTs, but without high voltage and high power. The display system is suitable for replacing CRTs in existing display systems in which CRTs are currently used as the image source, thus solving the obsolescence issue of CRTs. The visual display system is especially suitable for use in a heads-up-display (HUD) system as the image producing system.

BRIEF DESCRIPTION OF THE DRAWINGS

The same elements or parts throughout the figures of the drawings are designated by the same reference characters, while equivalent elements bear a prime designation.

DETAILED DESCRIPTION OF THE INVENTION

Figure 1:
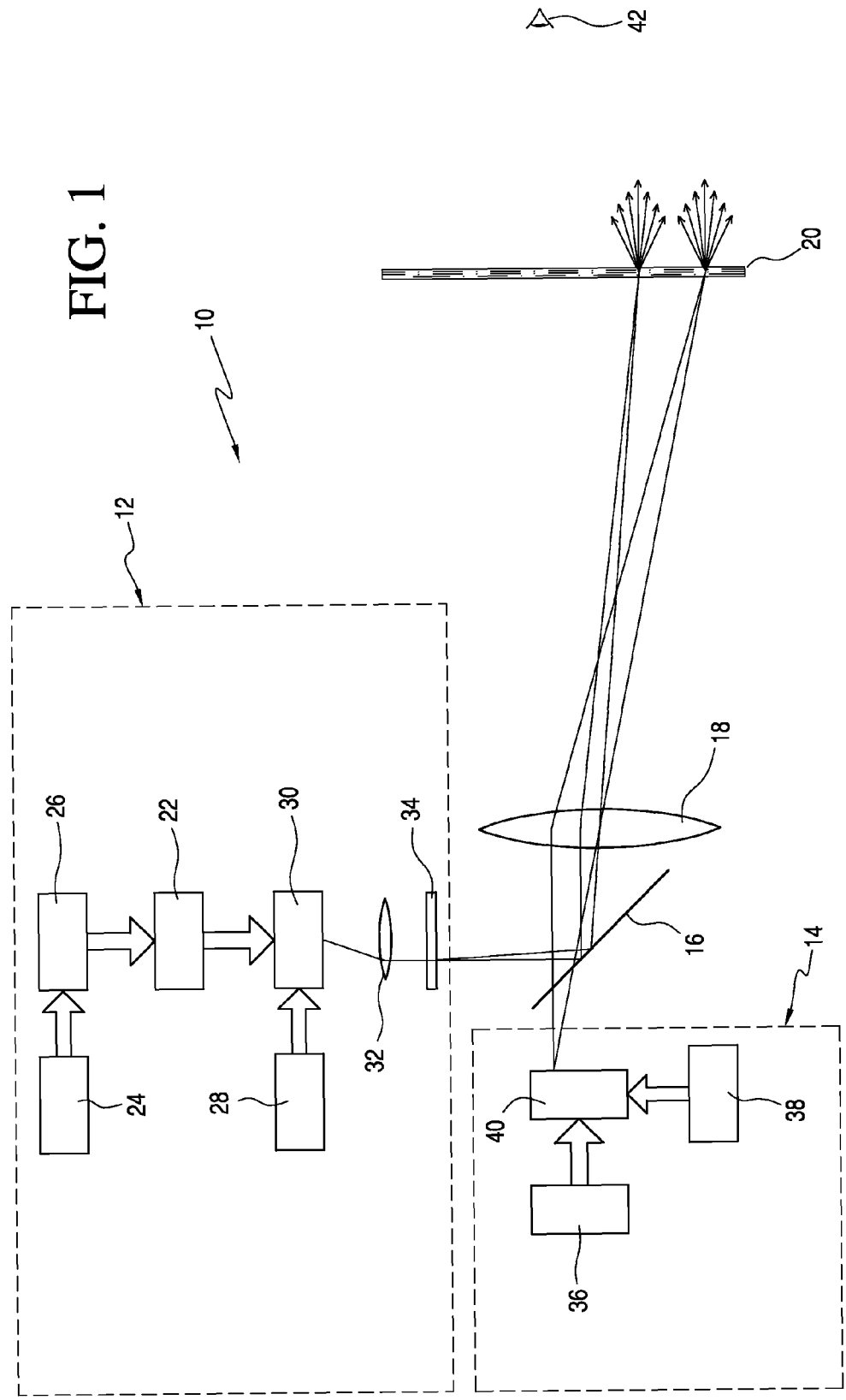
FIG. 1 is a functional schematic illustration of a first embodiment of the present invention in which a visual display system using two independent image sources and a common image forming optical system.

Referring now to the drawings and the characters of reference marked thereon, FIG. 1 illustrates a visual display system, designated generally as 10, in accordance with the principles of the present invention.

The visual display system includes a first image source, designated generally as 12, for producing a first image containing high luminance symbological information using a vector drawing system. A second image source 14 produces a second image containing video, graphical, and/or symbology information with a brightness lower than the brightness of the first image. The second image source 14 employs a raster or vector scan scheme to generate the image. A light combining optical element 16 combines the light from the first and the second image sources 12, 14. An image forming optical system 18 receives the combined light from the light combining optical element 16 for forming a new image comprising a superimposition of the first image and the second image at a final image plane of the system 10. A light receiving element 20, located at the final image plane of the system 10, receives the new image from the image forming optical system 18 and adjusts the characteristics of the light from the new image to generate a final image for direct or indirect viewing.

The first image source 12 includes a first light source 22 which may be, for example, a solid state or semiconductor laser or light emitting diode (LED) to provide illumination of the image source. A symbology data generator 24 generates symbology input image data signals. The symbology data generator 24 is electronic circuitry utilizing discrete commercially available integrated circuits and/or Application-Specific-Integrated-Circuits (ASICs), converting incoming data signals to specific format and timing sequences, generating control signals, and performing other functions such as data correction and computation, to produce a proper display image. In a preferred embodiment, a first light modulating element 26 is operatively connected to the first light source 22 for controlling the intensity of the first light source 22 using the symbology input image data signals. The first light modulating element 26 may be, for example, high speed and high precision current or voltage switching circuitry to modulate the drive current into the LED or laser light source so the output intensity of the light source is controlled. The first light modulating element 26 may alternatively be an electro-optical switching device which can modulate the intensity of the incoming light beam according to the symbology image data signal while keeping the intensity of the light source constant. A vector scanner controller 28 provides vector coordinates. A vector optical scanning device 30 is operatively associated with the first light modulating element 26 for receiving modulated light and utilizing the vector coordinates to provide a scanning light beam. The vector optical scanning device 30 may be, for example, commercially available two-dimensional optical Micro-electro-mechanical System (MEMS) devices, a system utilizing two one-dimensional MEMS devices arranged in proper geometric configuration, or other types of mechanical scanning mirror systems. The deflection angle of the scanning mirror may be in the range of 2-50 degrees. The vector scanner controller 28 is a drive electronics system for providing voltage, static electrical field, magnetic field, mechanical force, or other physical means to control the movement of the scanning mirror in the scanner device. Typically, one can obtain the scanner device and drive electronics from the same company.

A beam focusing optical element 32 focuses the scanning light beam. It may be, for example, a set of lenses which can focus the light beam to form a spot sufficiently small to meet the display resolution requirement. The image forming optical element 34, located at the back focal plane of image forming optical system 18, receives the focused scanning light beam, displaying the resulting symbology information, and presenting the light from the first image on the light combining optical element 16. The image forming optical element 34 may be, for example, a high resolution optical diffuser with diffusing angle from 0.25-30 degrees, which not only intersects the focused light to form an image, but is also able to further control the spectral characteristics, divergence, polarization, and intensity of the light.

The second image source 14 includes a second light source 36 which may be, for example, a single high power light emitting diode, or an array of light emitting diode devices with proper light collection optics so that the light from the light emitting devices is collected efficiently and effectively on to the surface of a second light modulating element 40. A graphic data generator 38 converts the original input information data to the graphic input image data signals. The graphic data generation is achieved using a set of electronic components, or an Application-Specific-Integrated-Circuits (ASIC) chip-set. The second light modulating element 40 is controlled by the graphic input image data signals for modulating the light beam from the second light source 36, forming the second image and presenting the light from the second image on the light combining optical element 16. The second light modulating element 40 is a light modulating device employing sequential addressing schemes (Raster Scan Mode). It may be, for example, an actively addressed liquid crystal display such as an active-matrix-liquid-crystal-display (AMLCD) or Liquid-Crystal-on-Silicon (LCoS). The element 40 may be a Digital-Light-Processing (DLP) device, a liquid crystal Spatial-Light-Modulator (SLM), or, a resonate two-dimensional MEMS optical scanner with light source 36 modulated by the graphic input image data signal from the graphic data generator. The MEMS scanner device may operate in either raster or vector scanning mode. Other MEMS-based electro-mechanical-optics devices may alternatively be used as the light modulating device, for example, a Grating-Light-Valve (GLV) device.

The second illumination source 36 and second light modulating element 40 may be combined into one device to become an emissive type of display. Such an emissive display device may be, for example, a high brightness Organic-Light-Emitting-Diode (OLED) display, or a miniature high brightness CRT.

The symbology information contained within the first image may be, for example, alphanumerical data images, icon images, signs, special symbols, and indicators. The graphical information contained within the second image may be, for example, graphical images displaying video data input to the visual display system, moving images, informational data including maps, equipment status, still images, combined images from multiple data sources, and graphical representation of other symbology or non-symbology information required for intended use of the visual display system 10.

The lights from the first and second image sources have different optical properties such as different color, wavelength, polarization state, angle of incidence, divergence, spatial location in the optical field in relative to the optical axis of the visual display system, and/or sequence in time. The luminance at the image forming optical element 34 is sufficiently high such that the luminance at the light receiving element 20, as perceived by the viewer 42, is from 4,000 foot-Lambert to 20,000 foot-Lambert. The luminance at the surface of the second image modulating element 40 is sufficiently high such that the luminance at the light receiving element 20, as perceived by the viewer 42, is from 200 foot-Lambert to 2,000 foot-Lambert.

The light combining optical element 16 may be of different varieties, depending on the characteristics of the lights from the first and the second image sources. For example, a dichroic beam combiner may be used if the lights from the first and second image sources have different color or wavelengths. A polarizing beam combiner may be used if the lights from the first and second image sources have different polarization states. A transflective mirror may be used if the lights from the first and second images sources have similar or identical color or polarization states, but with different intensities, angle of incidence, divergence, location in the optical field relative to the optical axis of the visual display system, and sequence in time.

Other types of beam combining optical devices may be, for example, a prismatic element, diffraction element, or holographic optical element, which can combine light beams not only based on their spectral and polarization characteristics, but also their angular or spatial properties.

The image forming optical system 18 includes light controlling optical elements for controlling the propagation of the light from the light combining optical element 16 so that the first and second images will have the quality and characteristics for a human observer to perceive, either at the light receiving element 20 directly (as shown by viewer 42), or through another optical system, such as an optical system of a heads-up-display, as discussed below in detail.

The light receiving element 20 located at the final image plane of the image forming optical system 10 may be of different varieties. For example, diffusers may be used for changing the characteristics of the light of the generated final image. Phosphors may be used for altering the direction of the propagation of light of the generated final image. Spectral filters may be used for changing the colors of the first and second images from the image sources by spectral filtering the light spectrum of the first and second images. Light enhancement films may be used for enhancing the quality of the first and second images.

The relative geometric location of first image source 12 and the second image source 14 can be exchanged so the light from the first image source will transmit through the light combining optical element 16; the light from the second image source will reflect off the light combining optical element 16.

The present invention provides a solution for a visual display system that is capable of displaying symbology information with luminance up to 20,000 foot-Lambert and graphic-video images with luminance up to 2,000 foot-Lambert, using two separate image sources. Each image source consumes minimal power so that the total power consumption of the visual display system remains low. The symbology image has very high contrast ratio and short latency to display. The graphic-video image has high resolution, and is independent of information content of the symbology image. The combination of a vector-type optical scanner and a raster scanning display device, and an optical system that can combine the images from each image source, mimics the operation of a CRT, but eliminates the drawback of the CRT.

Figure 2:
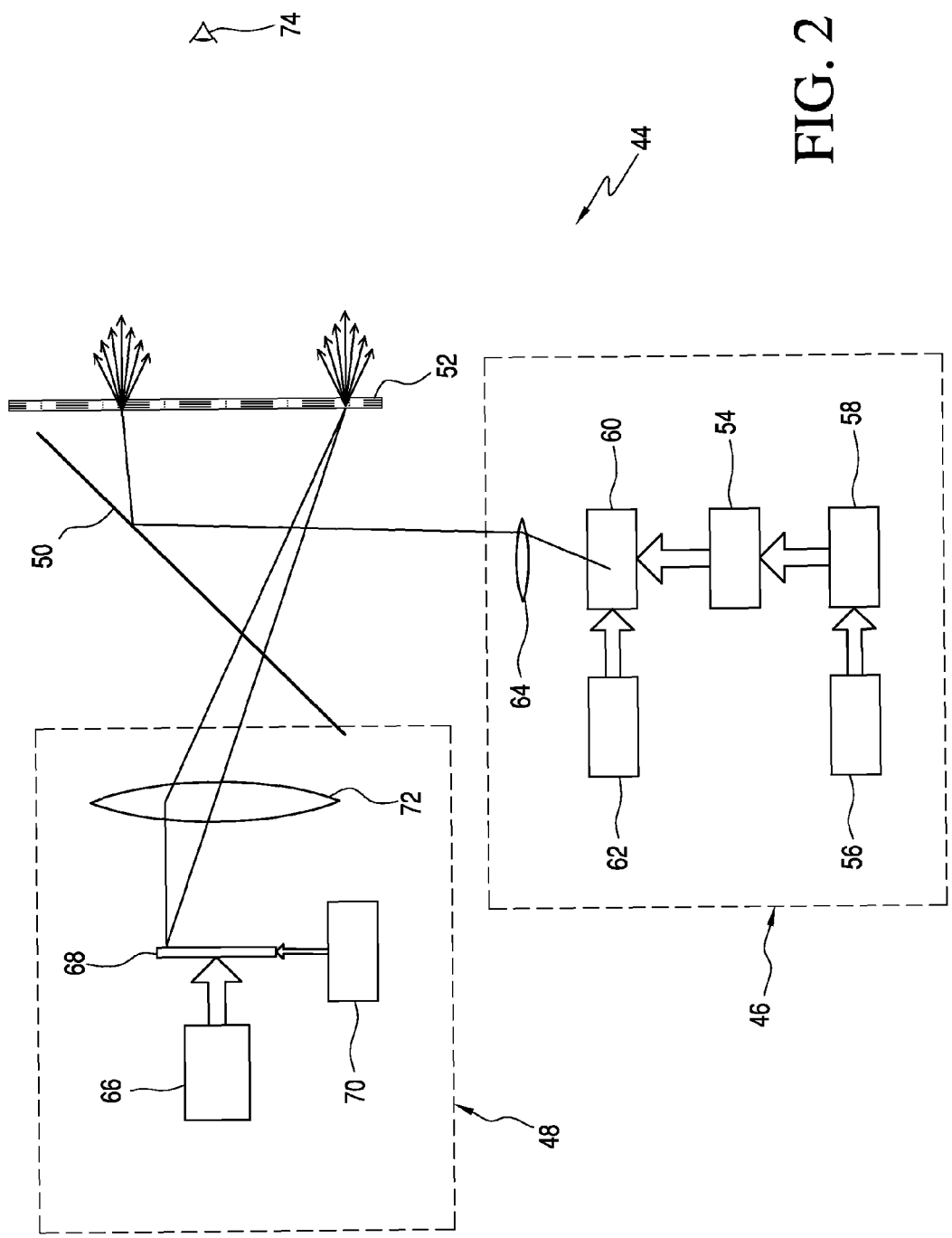
FIG. 2 is a functional schematic illustration of a second embodiment of the present invention using two independent image sources and separate image forming optics.

Referring now to FIG. 2, a second embodiment of the visual display system is illustrated, designated generally as 44. In this embodiment, two image sources have separate image forming optics. The visual display system includes a first image source, designated generally as 46, for producing a first image containing symbological information using a vector drawing system. A second image source 48 produces and projects a second image containing video, graphical, and/or symbology information with a brightness lower than the brightness of the first image. The second image source 48 employs a raster or vector scan scheme to generate the image. A light combining optical element 50 combines the light from the first and the second image sources 46, 48 to form a common light path thereafter, producing a superimposition of the first image and the second image at a final image plane of the visual display system 44. A light receiving element 52 located at the final image plane of the visual display system receives the light from the first image source 46 and the second image source 48 for forming a final combined image, and further controlling the characteristics of the light emitted from the final image.

The first image source 46 includes a first light source 54 which may be, for example, as in the first embodiment, a solid state or semiconductor laser or light emitting diode (LED) to provide illumination of the image source. A symbology data generator 56 generates symbology input image data signals. The symbology data generator 56, as in the first embodiment, is electronic circuitry utilizing discrete commercially available integrated circuits and/or Application-Specific-Integrated-Circuits (ASICs), converting incoming data signals to specific format and timing sequences, generating control signals, and performing other functions such as data correction and computation, to produce a proper display image. In a preferred embodiment, a first light modulating element 58 is operatively connected to the first light source 54 for controlling the intensity of the first light source 54 using the symbology input image data signals. The first light modulating element 58 may be, for example, high speed and high precision current or voltage switching circuitry to modulate the drive current into the LED or laser light source so the output intensity of the light source is controlled. The first light modulating element 58 may alternatively be an electro-optical switching device which can modulate the intensity of the incoming light beam according to the symbology image data signal while keeping the intensity of the light source constant. A vector scanner controller 60 provides vector coordinates. A vector optical scanning device 60 is operatively associated with the first light modulating element 58 for receiving modulated light and utilizing the vector coordinates to provide a scanning light beam. As in the first embodiment, the vector optical scanning device 60 may be, for example, a commercially available two-dimensional optical Micro-electro-mechanical System (MEMS) device, a system utilizing two one-dimensional MEMS devices arranged in proper geometric configuration, or other type of mechanical scanning mirror system. The deflection angle of the scanning mirror may be in the range of 2-50 degrees. The vector scanner controller 62 is a drive electronics system for providing voltage, static electrical field, magnetic field, mechanical force, or other physical means to control the movement of the scanning mirror in the scanner device. As mentioned above, typically, one can obtain the scanner device and drive electronics from the same company.

A beam focusing optical element 64 focuses the scanning light beam. It may be, for example, a set of lenses which can focus the light beam to form a spot small enough to meet the display resolution requirement.

The second image source 48 includes a second light source 66 which may be, for example, a single high power light emitting diode, or an array of light emitting diode devices with proper light collection optics so that the light from the light emitting devices is collected efficiently and effectively on to the surface of a second light modulating element 68. A graphic data generator 70 converts the original input information data to the graphic input image data signals. The graphic data generation is achieved using a set of electronics components, or an Application-Specific-Integrated-Circuits (ASIC) chip-set. The second light modulating element 68 is controlled by the graphic input image data signals for modulating the light beam from the second light source 66, forming the second image and presenting the light from the second image on an image forming optical system 72. The image forming optical system 72 receives the light from the second light modulating element 68 and projects light from the second image on the light combining optical element 50.

As noted with respect to the first embodiment, in the second embodiment also, the second light modulating element 68 is a light modulating device employing sequential addressing schemes (Raster Scan Mode). It may be, for example, an actively addressed liquid crystal display such as an active-matrix-liquid-crystal-display (AMLCD) or Liquid-Crystal-on-Silicon (LCoS). The element 68 may be a Digital-Light-Processing (DLP) device, a liquid crystal Spatial-Light-Modulator (SLM), or, a resonate two-dimensional MEMS optical scanner with light source 66 modulated by the graphic input image data signal from the graphic data generator. The MEMS scanner device may operate in either raster or vector scanning mode. Other MEMS-based electro-mechanical-optics devices may also be used as the light modulating device, for example, a Grating-Light-Valve (GLV) device.

The image forming optical system 72 includes light controlling optical elements for controlling the propagation of the light from the second light modulating element 68 so that the second image will have the quality and characteristics for a human observer to perceive, either at the light receiving element 52 directly (as shown by viewer 74), or through another optical system, such as an optical system of a heads-up-display, as discussed below in detail.

The light combining optical element 50 may be of different varieties, depending on the characteristics of the lights from the first and the second image sources. For example, a dichroic beam combiner may be used if the lights from the first and second image sources have different color or wavelengths. A polarizing beam combiner may be used if the lights from the first and second image sources have different polarization states. A transflective mirror may be used if the lights from the first and second image sources have similar or identical color or polarization states, but with different intensities, angle of incidence, divergence, spatial location in the optical field relative to the optical axis of the visual display system, and sequence in time.

The relative geometric location of first image source 46 and the second image source 48 can be exchanged so the light from the first image source 46 will transmit through the light combining optical element 50; and, the light from the second image source 48 will reflect off the light combining optical element 50.

The second embodiment presents one of many possible geometric configurations of the same principle of present invention. Many other variations are possible. The present invention as a visual display system may include more than two image sources if necessary, and may use only one image source when satisfactory performance can be produced by a single image forming system or device.

Figure 3:
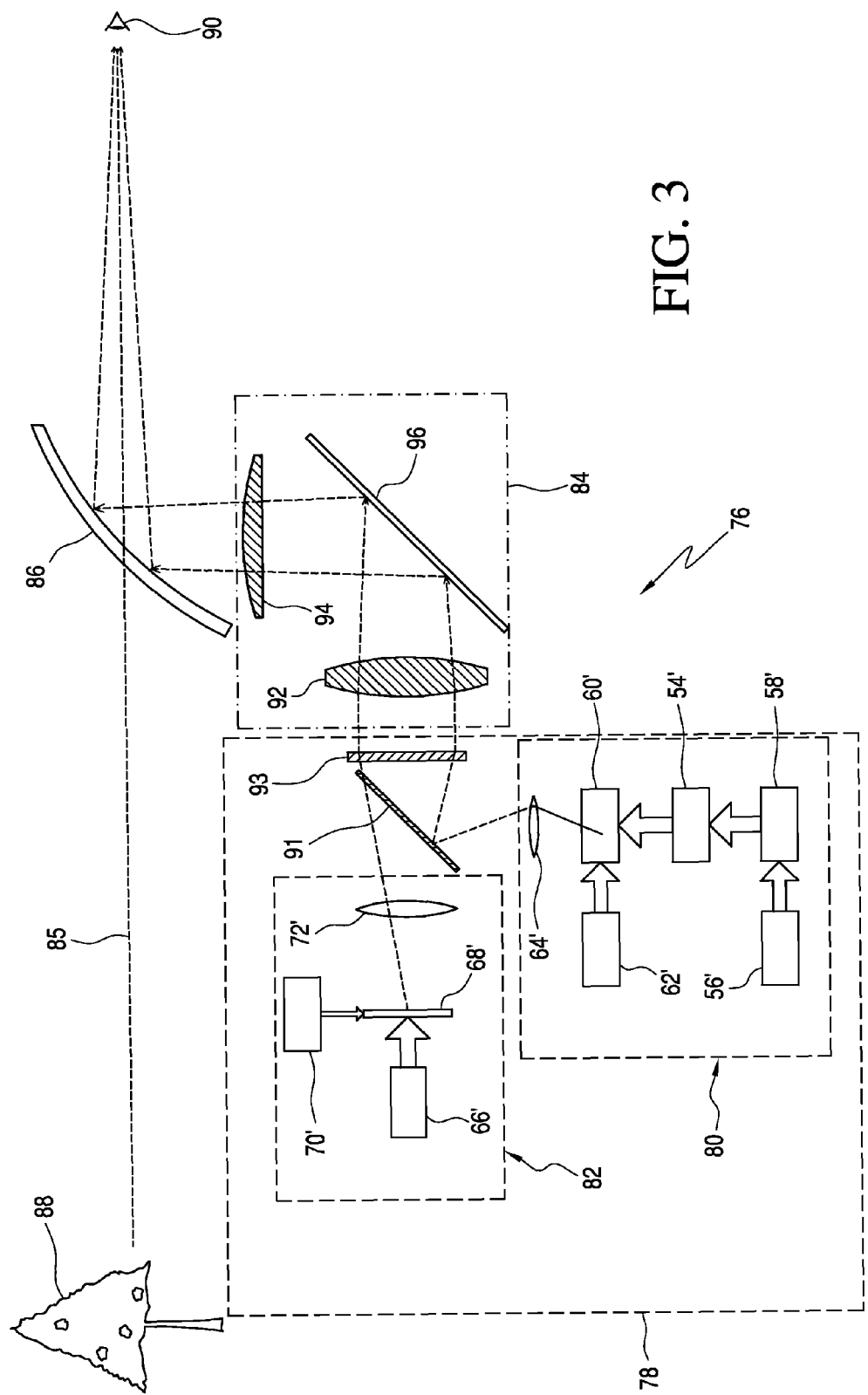
FIG. 3 is a functional illustration of a Heads-Up-Display (HUD) system using the principles of the present invention.

Referring now to FIG. 3, utilization of the visual display system for a Heads-Up-Display (HUD) system is illustrated, designated generally as 76. The HUD system 76 includes an image producing system, designated generally as 78, comprising a plurality of illumination and image sources. In this embodiment, a first image source 80 produces a first image containing symbological information using a vector drawing system. A second image source 82 produces a second image containing video, graphical, and/or symbology information with a brightness lower than the brightness of the first image.

A projection optics assembly 84 projects the image from the image producing system 78. A see-through image combining element 86, with partially reflective coatings and dioptric power, is operatively connected with the projection optics assembly 84 and cooperates with the projection optics assembly 84 for projecting the light from the projection optics assembly 84 to form an infinity focus, and directs the projected image from the projection optics assembly 84 to the viewer's line-of-sight 85 and forms an image superimposed on the real scene 88 as seen through the combining element 86 by the viewer 90 throughout viewer's field-of-view.

In this FIG. 3 showing, the first image source 80 may comprise the system of components, as shown and described relative to FIG. 2, relative to numeral designations 54', 56', 58', 60', 62' and 64'. Similarly, the second image source 82 may comprise the system of components, as shown and described relative to FIG. 2, relative to numeral designations 66', 68', 70', and 72'. It is noted that the system described in FIG. 1 could alternatively be utilized.

The image producing system 78 further includes a light combining optical element 91 for combining the light from the first image source 80 and the second image source 82 to form a common light path thereafter. A light receiving element 93 is located at the final image plane of the HUD system 76 for receiving the light from said light combining optical element for forming a combined final image, and further controlling the characteristics of the light emitted from the final image.

The projection optics assembly 84 comprises a plurality of refractive optical elements 92, 94 operatively connected to at least one reflective optical element 96. The refractive optical elements, which are typically in the form of spherical or aspherical lenses, prisms, and wedges, provide the optical power for collimating the light from the image producing system in order to project the light at infinity focus. In general, at least two refractive lenses may be used in conventional projection optics for a HUD system. The reflective elements, which are typically in the form of reflective lens, mirrors, or prisms, may provide additional optical power and change the propagation direction of the light beam into a predetermined direction toward the combiner and viewer. It is possible, however, to use only refractive elements or only reflective elements to construct a projection optics for a HUD system.

The see-through image combining element 86 is a see-through type light combining element. It has a reflectance from 10% to 80% at the primary wavelength of the light from the image producing system 78, and photopic transmission of the light from the real scene 88 from 50% to 90%. It may have a dioptric power from 0.0 to 2.5 diopters. The combined optical power from the optical elements in the projection optics assembly 84 and from the image combining element 86 projects the image from the image producing system 78 to form an image at ideally infinity distance, superimposed on the real scene 88.

The HUD system 76 of the present invention may have symbology luminance of 1000 foot-lambert or greater, and graphic-video luminance of 200 foot-lambert or greater perceived by the viewer 90. As a result of using two image sources with a vector and raster scan scheme for producing symbology and graphic-video images, respectively, the total power consumption of the image producing system for the HUD system is from 2.0 to 20.0 watts. Such low power consumption and high reliability of the image producing system can significantly improve the reliability of the HUD system 76 compared to conventional HUD systems, under harsh environmental conditions.

As a result of using a vector scan scheme, the contrast ratio of the symbology image is from 500:1 to 30,000:1, depending on the information content of the symbology image. At such a high contrast ratio, the symbology information and overall background of the symbology image will not interfere with the real scenery under day or night conditions, which can significantly improve the viewer's visual acuity and operation performance.

Other benefits of the present invention over conventional visual display systems includes the ability for a compact design, relatively low cost, low latency for symbology information, increased information content, and the addition of new functionalities. The imaging producing system of the HUD system disclosed herein can be used in many different types of display devices, and in various combinations, as replacements for CRTs.

Other embodiments and configurations may be devised without departing from the spirit of the invention and the scope of the appended claims.

The invention claimed is:

1. A heads-up-display (HUD) system, comprising:
a) an image producing system comprising a plurality of illumination and image sources, said plurality of illumination and image sources, comprising at least:
   i) a HUD-symbology image source configured to produce a first image containing symbological information, said HUD-symbology image source comprising a non-cathode ray tube (non-CRT), vector drawing system; and,
   ii) a HUD-video image source configured to produce a second image containing video information, said HUD-video image source comprising a digital system;
b) a projection optics assembly for projecting a resulting image from the image producing system; and
c) a see-through image combining element with partially reflective coatings and dioptric power operatively connected with the projection optics assembly and cooperating with said projection optics assembly for projecting light from said projection optics assembly to form an infinity focus, and directing the projected image from the projection optics assembly to a viewer's line-of-sight and forming an image superimposed on a real scene as seen through said combining element by the viewer throughout the viewer's field-of-view.

2. The heads-up-display system of claim 1, wherein said image producing system further comprises
a) a light combining optical element for combining light from said HUD-symbology image source and said HUD-video image source to form a common light path thereafter; and,
b) a light receiving element located at a final image plane of the HUD system for receiving the light from said light combining optical element for forming a combined final image, and further controlling characteristics of the light emitted from the final image.

3. The heads-up-display system of claim 2, wherein said light combining optical element is selected from a group consisting of:
a) a dichroic beam combiner if the lights from said HUD-symbology image source and said HUD-video image source have different color or wavelengths;
b) a polarizing beam combiner if the lights from said HUD-symbology image source and said HUD-video image source have different polarization states; and,
c) a transflective mirror if the lights from said HUD-symbology image source and said HUD-video image source have similar or identical color or polarization states but different intensities.

4. The heads-up-display system of claim 2, wherein said light receiving element located at the final image plane of said image forming optical system, comprises an optical element or combination of optical elements selected from a group consisting of:
- a) diffusers for changing characteristics of the light of said final image to meet the field of view requirement of the viewer or the subsequent optical systems;
- b) phosphors for altering a wavelength or color of the propagation of light of said final image;
- c) spectral filters for changing colors of said first and second images by spectral filtering light spectrum of said first and second images; and,
- d) light enhancement films for enhancing quality of said first and second images.

5. The heads-up-display system of claim 2, wherein said HUD-symbology image source comprises:
- a) a first light source comprising: a solid state or semiconductor laser or light emitting diode (LED);
- b) a symbology data generator for generating symbology input image data signals;
- c) a first light modulating element operatively connected to said first light source for controlling intensity of said first light source using said symbology input image data signals;
- d) a vector scanner controller for providing vector coordinates;
- e) a vector optical scanning device operatively associated with said first light modulating element for receiving modulated light therein and utilizing said vector coordinates to provide a scanning light beam; and,
- f) a beam focusing optical element for focusing said scanning light beam, and presenting light from said first image on said light combining optical element.

6. The heads-up-display system of claim 2, wherein said HUD-symbology image source comprises:
- a) a first light source;
- b) a symbology data generator for generating symbology input image data signals;
- c) a first light modulating element operatively connected to said first light source for controlling intensity of said first light source using said symbology input image data signals, said first light modulating element comprising: high speed and high precision current or voltage switching circuitry; or, an electro-optical switching device;
- d) a vector scanner controller for providing vector coordinates;
- e) a vector optical scanning device operatively associated with said first light modulating element for receiving modulated light therein and utilizing said vector coordinates to provide a scanning light beam; and,
- f) a beam focusing optical element for focusing said scanning light beam, and presenting light from said first image on said light combining optical element.

7. The heads-up-display system of claim 2, wherein said HUD-symbology image source comprises:
- a) a first light source;
- b) a symbology data generator for generating symbology input image data signals;
- c) a first light modulating element operatively connected to said first light source for controlling intensity of said first light source using said symbology input image data signals;
- d) a vector scanner controller for providing vector coordinates;
- e) a vector optical scanning device operatively associated with said first light modulating element for receiving modulated light therein and utilizing said vector coordinates to provide a scanning light beam, said vector optical scanning device comprising: a two-dimensional optical Micro-electro-mechanical System (MEMS) device, a system utilizing two one-dimensional MEMS devices, or a mechanical mirror system; and,
- f) a beam focusing optical element for focusing said scanning light beam, and presenting light from said first image on said light combining optical element.

8. The heads-up-display system of claim 1, wherein said first image contains symbology information selected from a group consisting of:
  alphanumerical data images, signs, icon images, special symbols, and indicators.

9. The heads-up-display system of claim 1, wherein the lights from said HUD-symbology image source and said HUD-video image source have different optical properties selected from a group of properties consisting of:
  color, wavelength, polarization state, intensity, angle of incident, divergence, location in the optical field in relative to the optical axis of the system, and sequence in time.

10. The heads-up-display system of claim 1, wherein said projection optics assembly comprises a plurality of refractive optical elements operatively connected to at least one reflective optical element.

11. The heads-up-display system of claim 1, wherein said see-through image combining element has a dioptric power in a range of from about 0.0 to 2.5 diopters.

12. The heads-up-display system of claim 1, wherein said video information has a brightness lower than a brightness of said first image.

13. A heads-up-display (HUD) system, comprising:
- a) an image producing system comprising a plurality of illumination and image sources, said plurality of illumination and image sources, comprising at least:
  - i) a HUD-symbology image source configured to produce a first image containing symbological information, said HUD-symbology image source comprising a non-cathode ray tube (non-CRT), vector drawing system; and,
  - ii) a HUD-video image source configured to produce a second image containing video information, said HUD-video image source comprising a digital system;
- b) a projection optics assembly for projecting a resulting image from the image producing system; and
- c) a see-through image combining element with partially reflective coatings and dioptric power operatively connected with the projection optics assembly and cooperating with said projection optics assembly for projecting light from said projection optics assembly to form an infinity focus, and directing the projected image from the projection optics assembly to a viewer's line-of-sight and forming an image superimposed on a real scene as seen through said combining element by the viewer throughout the viewer's field-of-view wherein,
said HUD-symbology image source comprises:
  - i) a first light source;
  - ii) a symbology data generator for generating symbology input image data signals;
  - iii) a first light modulating element operatively connected to said first light source for controlling intensity of said first light source using said symbology input image data signals;
  - iv) a vector scanner controller for providing vector coordinates;

v) a vector optical scanning device operatively associated with said first light modulating element for receiving modulated light therein and utilizing said vector coordinates to provide a scanning light beam; and, vi) a beam focusing optical element for focusing said scanning light beam, and presenting light from said first image on a light combining optical element; and, said HUD-video image source comprises:

i) a second light source;

ii) a graphic data generator for generating graphic input image data signals;

iii) a second light modulating element controlled by said graphic input image data signals for modulating a light beam from said second light source, producing said second image; and, iv) an image forming optical system for receiving the light from said second light modulating element for projecting light from said second image on said light combining optical element.

* * * * *